(12) United States Patent
Dai et al.

(10) Patent No.: US 7,228,196 B2
(45) Date of Patent: Jun. 5, 2007

(54) COMPUTER-AIDED MANUFACTURING SYSTEM AND METHOD FOR SHEET-METAL PUNCHING

(75) Inventors: Zejun Dai, Shenzhen (CN); Xiaobing Gao, Shenzhen (CN); Jin-Song Li, Shenzhen (CN); ZhiHui Wang, Shenzhen (CN); Wei Shao, Shenzhen (CN); ShengZhong Yi, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 373 days.

(21) Appl. No.: 10/889,682

(22) Filed: Jul. 12, 2004

(65) Prior Publication Data

US 2005/0010325 A1    Jan. 13, 2005

(30) Foreign Application Priority Data

Jul. 11, 2003    (TW)    ................................ 92119077 A

(51) Int. Cl.
*G06F 19/00* (2006.01)
(52) U.S. Cl. ........................ 700/173; 700/118; 345/419
(58) Field of Classification Search .................. 700/98, 700/105, 118, 163, 173, 97, 182; 345/419, 345/420, 441; 382/153; 703/22, 2
See application file for complete search history.

(56) References Cited

U.S. PATENT DOCUMENTS

| | | | |
|---|---|---|---|
| 5,798,928 A | 8/1998 | Niwa | |
| 6,219,586 B1 * | 4/2001 | Sakai | 700/182 |
| 6,434,441 B1 | 8/2002 | Beauchamp et al. | |
| 2001/0004840 A1 * | 6/2001 | Nagasawa | 72/14.8 |
| 2001/0049953 A1 * | 12/2001 | Nagasawa | 72/14.8 |
| 2002/0139229 A1 * | 10/2002 | Yamamoto | 83/39 |

* cited by examiner

*Primary Examiner*—Kidest Bahta
(74) *Attorney, Agent, or Firm*—Wei Te Chung

(57) ABSTRACT

A computer-aided manufacturing system for sheet-metal punching includes client computers (6), a server (1), and a database (2). The client computers are used for transmitting client drawings to the server, and obtaining machining drawings from the server. The database is used for storing the client drawings, punching tool information, turret information, punching tool layout information, relevant production management information, machining drawings of workpieces, and statements for control of machining processes. The server is connected to a production management system (3) through a network (4), and is used for automatically selecting, mounting and laying out punching tools, optimizing turrets, simulating machining of workpieces, and exporting CNC (computer numerical control) code files, types of machines, machining information on workpieces and materials of the workpieces to the production management system in order to have statements for control of relevant machining processes generated. A related computer-aided manufacturing method for sheet-metal punching is also provided.

27 Claims, 6 Drawing Sheets

COMPUTER-AIDED MANUFACTURING SYSTEM AND METHOD FOR SHEET-METAL PUNCHING

BACKGROUND OF THE INVENTION

1. Field of the Invention

The present invention relates to computer-aided manufacturing systems and methods, and particularly to a computer-aided manufacturing system and method for sheet-metal punching.

2. Related Art of the Invention

With the ongoing globalization of commerce, market competition between modem international corporations is becoming more and more intense. All such corporations engaged in manufacturing have to try their best to improve their competitiveness. Improving production efficiency is a never-ending challenge. Improvements in machine punching tool hardware and falling commodity prices have helped increase many corporations' efficiency. Further, the use of computers to automate manufacturing has become popular, and has improved the speed and quality of sheet-metal punching. Sheet-metal punching at the present time mostly uses CAD (Computer Aided Design) to form 3-dimensional models and define workpieces, and CAM (Computer Aided Manufacturing) to select an optimum machining path for a punching tool and generate CNC (computer numerical control) codes.

There are two notable problems with automated sheet-metal punching at the present time: people are still needed to control and oversee the entire process from model-forming to code-generating; and the entire process is not as smooth as comparable processes controlled by intelligent machining via a computer.

The abovementioned problems tend to give rise to high labor intensity, human error, and limited production efficiency. What is needed is a system and method which can reduce or even eliminate these difficulties.

SUMMARY OF THE INVENTION

Accordingly, a main objective of the present invention is to provide a computer-aided manufacturing system and method for sheet-metal punching, which can automatically select and lay out punching tools, optimize turrets, generate CNC code files and simulate machining of workpieces, and which can automatically control the whole process of sheet-metal punching.

To accomplish the above objective, a computer-aided manufacturing system for sheet-metal punching ("the system") in accordance with a preferred embodiment of the present invention is provided herein. The system includes a plurality of client computers, a server, and a database. The client computers are used for transmitting client drawings to the server, and obtaining machining drawings from the server. The database is for storing all information used and generated by the system, including the client drawings received from the client computers, punching tool information, turret information, punching tool layout information, relevant production management information, machining drawings of workpieces, and statements. The server is used for selecting, mounting and laying out punching tools, optimizing turrets, simulating machining of the workpieces, and exporting relevant production management information to a production management system in order to have statements for control of relevant machining processes generated. The relevant production management information comprises CNC code files, types of machines which are used to machine the workpieces, machining information on the workpieces, and materials of the workpieces.

Further, the present invention provides a preferred computer-aided manufacturing method for sheet-metal punching, comprising the steps of: (a) receiving a client drawing from a client computer, and obtaining information on workpieces from the client drawing; (b) selecting a punching tool for each type of drawing entity of the workpieces according to a shape and sizes of the type of drawing entity and according to machining allowances set by users; (c) mounting the selected punching tools, and selecting an optimum machining path for each selected punching tool; (d) setting a machining sequence for the selected punching tools on a turret; (e) optimizing a sequence of locations of the selected punching tools on the turret according to the machining sequence and the principle that punching tools are changed in the shortest possible time; (f) generating a CNC code file; (g) constructing figurations of the punching tools according to the CNC code file, and simulating machining of the workpieces according to the optimized turret information, the figurations and machining paths of the selected punching tools; and (h) generating statements for control of relevant machining processes.

Other objects, advantages and novel features of the present invention will be drawn from the following detailed description with reference to the attached drawings, in which:

DETAILED DESCRIPTION OF THE INVENTION

Figure 1:
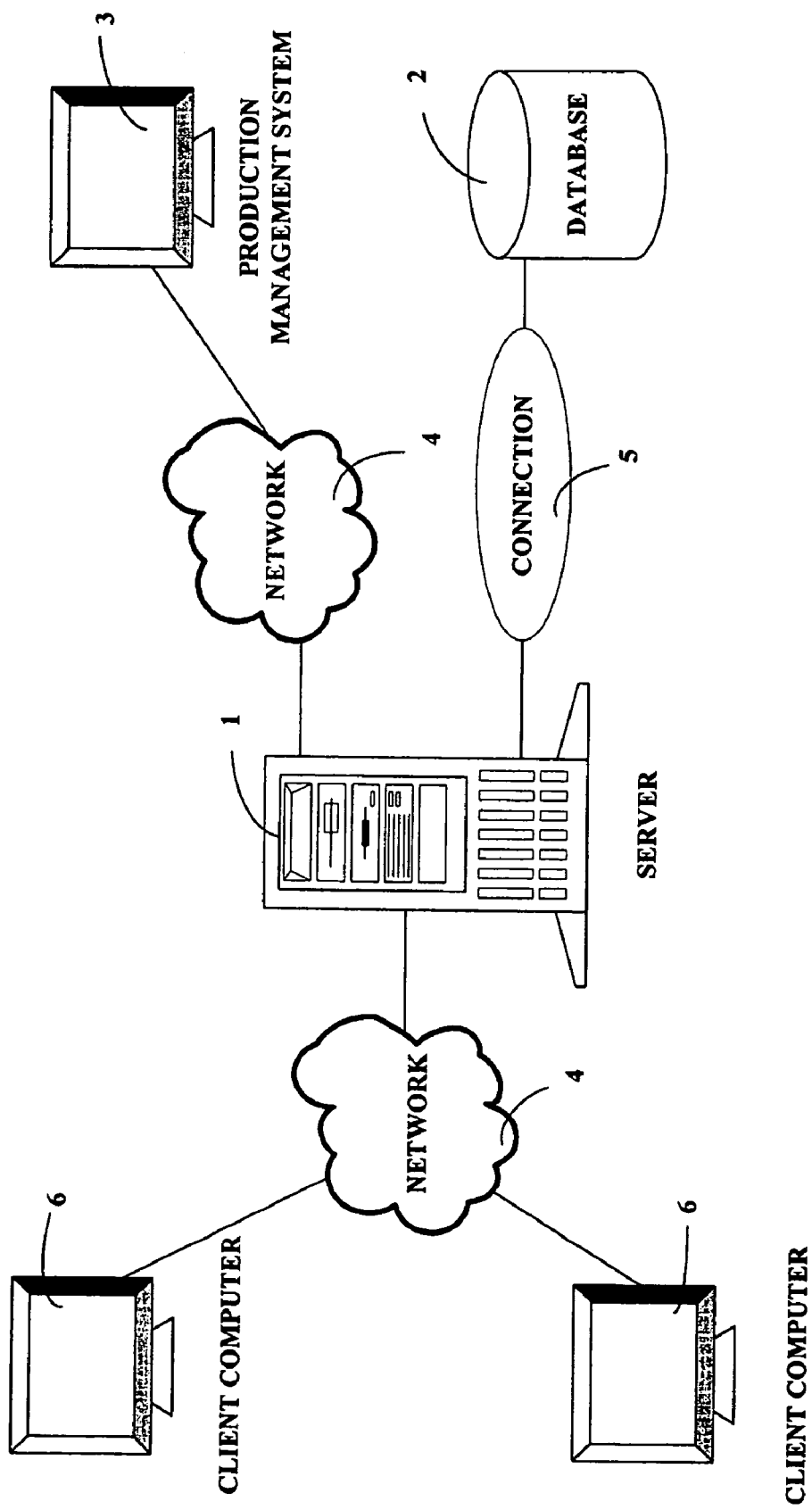
FIG. 1 is a schematic diagram of hardware infrastructure of a computer-aided manufacturing system for sheet-metal punching in accordance with the preferred embodiment of the present invention.

FIG. 1 is a schematic diagram of hardware infrastructure of a computer-aided manufacturing system for sheet-metal punching (hereinafter "the system") in accordance with the preferred embodiment of the present invention. The system comprises a plurality of distributed client computers 6, a server 1, and a database 2. The client computers 6 are connected to the server 1 through a network 4, and enable users to communicate with the server 1, transmit client drawings to the server 1, and obtain machining drawings from the server 1. The network 4 may be any suitable communication architecture required by the system, such as a local area network or a wide area network. The server 1 is connected to a production management system 3 also through the network 4, and is connected to the database 2 through a connection 5. The connection 5 is a database connectivity such as an Open Database Connectivity (ODBC) or a Java Database Connectivity (JDBC). The server 1 comprises a plurality of function modules (described in detail below in relation to FIG. 2), and is used for: obtaining information on workpieces from a client drawing; selecting, mounting and laying out punching tools; optimizing turrets; generating CNC code files; simulating machining of the workpieces; and exporting relevant production management information to the production management system 3 in order to have statements for controlling of machining processes generated. Laying out punching tools means selecting an optimum machining path for each punching tool. The database 2 stores all information including the client drawings, punching tool information, turret information, punching tool layout information, relevant production management information, machining drawings of workpieces, and statements. The punching tool information comprises a specification and parameters of each type of punching tool. The turret information comprises types and a machining sequence of punching tools, and sizes and a distribution of tool stations on each turret. The machining sequence of punching tools on a turret corresponds to the sequence of locations of punching tools on the turret. The punching tool layout information comprises an optimum machining path of each punching tool on a turret. The relevant production management information comprises types of machines which are used to machine the workpieces, materials of the workpieces, machining information on the workpieces, and the CNC code files.

Figure 2:
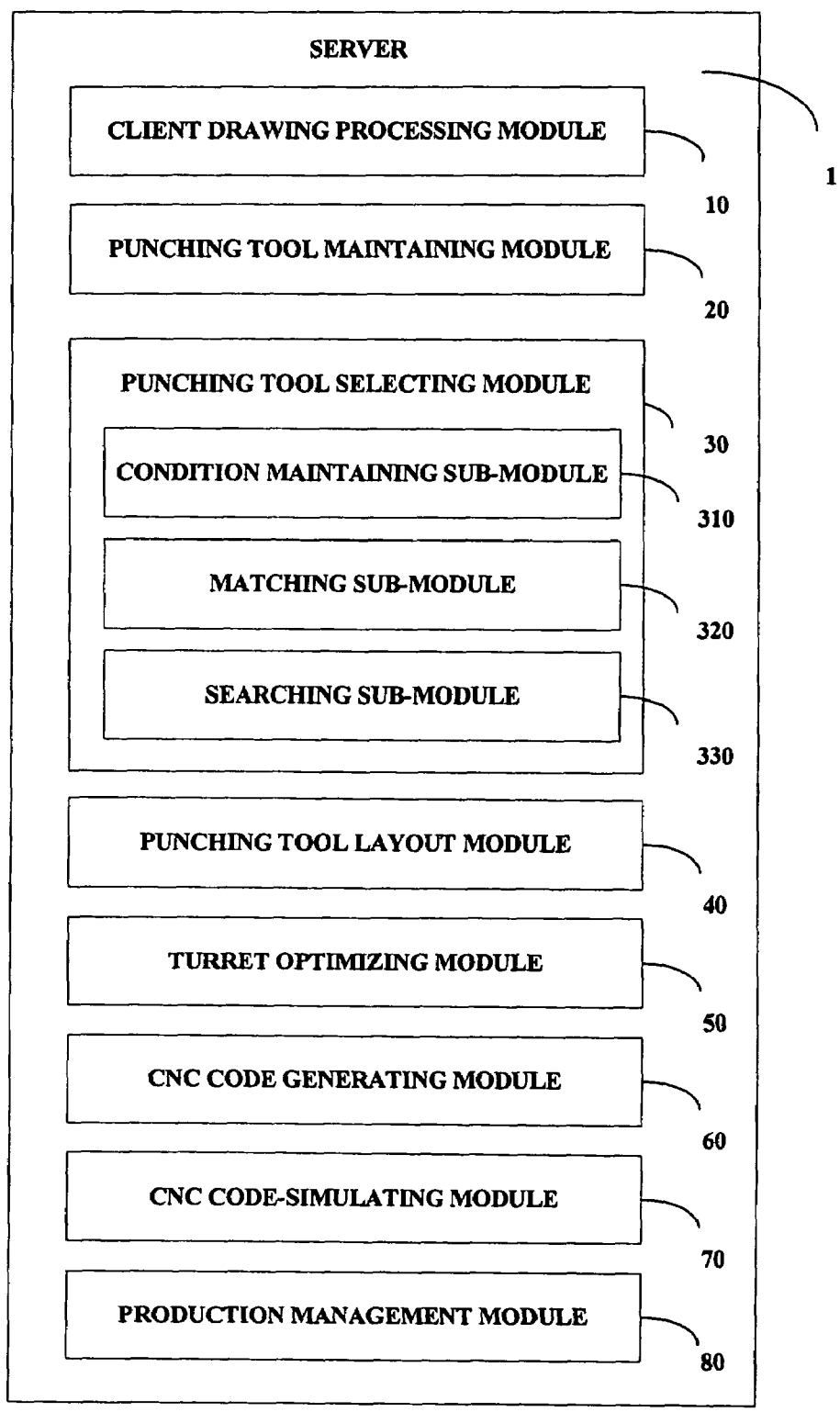
FIG. 2 is a schematic diagram of main function modules of a server of the system of FIG. 1.

FIG. 2 is a schematic diagram of main function modules of the server 1. The server 1 comprises a client drawing processing module 10, a punching tool maintaining module 20, a punching tool selecting module 30, a punching tool layout module 40, a turret optimizing module 50, a CNC code generating module 60, a CNC code-simulating module 70, and a production management module 80.

The client drawing processing module 10 is used for receiving client drawings from the client computers 6, obtaining information on workpieces from the client drawings, and storing the client drawings in the database 2. The punching tool maintaining module 20 is used for modifying parameters of the punching tools, and deleting or replacing the punching tools. The punching tool selecting module 30 is used for selecting optimum punching tools for each type of drawing entity in accordance with parameters of the type of drawing entity and machining allowances set by users. The parameters of each type of drawing entity comprise a shape and sizes of the type of drawing entity.

The punching tool selecting module 30 comprises a condition maintaining sub-module 310, a matching sub-module 320, and a searching sub-module 330. The condition maintaining sub-module 310 is used for calculating exact conditions and inexact conditions for each type of drawing entity. The exact conditions are calculated according to a shape and sizes of the type of drawing entity, and comprise a radius, an including angle and an apex of the type of drawing entity. The inexact conditions are calculated according to materials of workpieces and machining allowances set by users, and comprise a rotational angle and a rotational direction of the type of drawing entity. The matching sub-module 320 is used for determining whether any punching tool on a turret matches with at least one type of drawing entity according to the calculated exact conditions or inexact conditions of the type of drawing entity, and selecting the punching tool if it matches with the exact conditions or inexact conditions of at least one type of drawing entity. The searching sub-module 330 is used for searching in the database 3 for corresponding punching tool information if no punching tool on the turret matches with any one type of drawing entity.

The punching tool layout module 40 is used for selecting a corresponding tool station on the turret for each selected punching tool according to the type of the turret and the selected punching tool's specifications, mounting the punching tool in the corresponding tool station, and laying out the punching tools. According to the preferred embodiment, laying out the punching tools means selecting an optimum machining path for each selected punching tool. The turret optimizing module 50 is used for optimizing a sequence of locations of punching tools on each turret according to the machining sequence of the punching tools on the turret and a principle that punching tools are changed in the shortest possible time. According to the preferred embodiment, the machining sequence of the punching tools means the sequence in which the punching tools are used to machine the workpieces. The CNC code generating module 60 is used for generating CNC code files according to the optimized turret information and machining path of each punching tool on each turret. The CNC code-simulating module 70 is used for simulating machining of the workpieces, analyzing the CNC codes, searching in the database 2 for corresponding punching tool information, generating machining drawings of the workpieces, and storing the machining drawings in the database 2. The production management module 80 is used for exporting relevant production management information to the production management system 3. The production management system 3 then calculates usage rates of the materials of the workpieces and machining times for the workpieces, and generates statements for controlling of machining processes. The relevant production management information includes the CNC code files, types of the machines, information on machining, and the materials of the workpieces.

Figure 3:
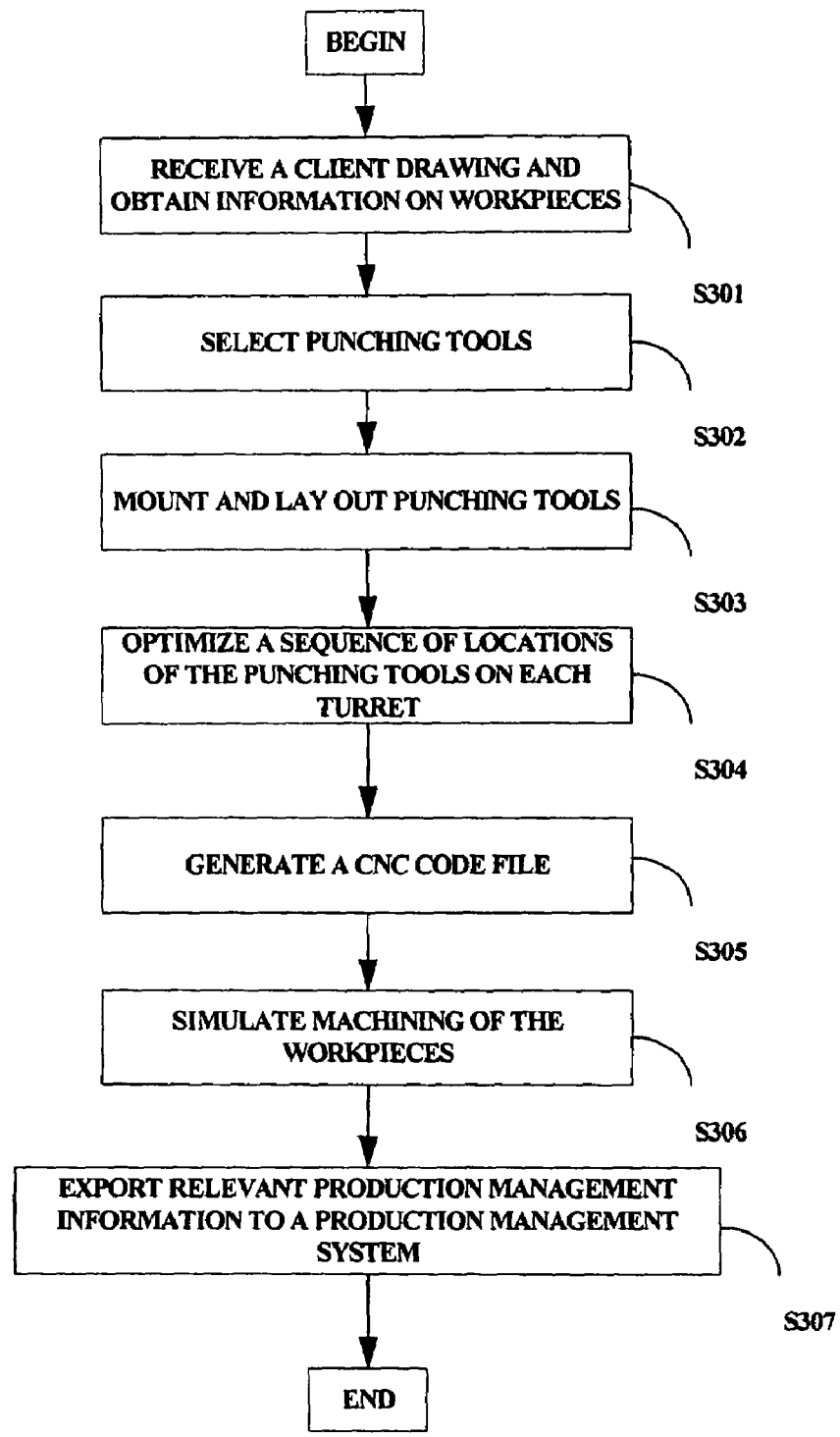
FIG. 3 is a flowchart of a preferred method for implementing the system of the present invention.

FIG. 3 is a flowchart of a preferred method for implementing the system of the present invention. In step S301, the client drawing processing module 10 receives a client drawing from a client computer 6 and obtains information on workpieces. In step S302, the punching tool selecting module 30 selects punching tools for each type of drawing entity according to a shape and sizes of the type of drawing entity and according to materials of the workpieces and machining allowances set by users. In step S303, the punching tool layout module 40 selects a corresponding tool station for each selected punching tool according to the type of a corresponding turret and specifications of the selected punching tool, mounts the selected punching tools in the corresponding tool stations, and lays out all the selected punching tools. According to the preferred embodiment, laying out all the selected punching tools means selecting an optimum machining path for each of the selected punching tools. In step S304, the turret optimizing module 50 optimizes a sequence of locations of punching tools on the turret according to the machining sequence of the punching tools on the turret and according to the principle that punching tools are changed in the shortest possible time. In step S305, the CNC code generating module 60 generates a CNC code file according to the optimized turret information and the machining paths of punching tools on the turret. In step S306, the CNC code-simulating module 70 constructs figurations of punching tools and simulates machining of the workpieces according to the generated CNC code file. In step S307, the production management module 80 exports relevant production management information to the production management system 3. The production management system 3 can then calculate usage rates of materials of the workpieces and machining times of the workpieces, in order to generate a statement for control of relevant machining processes.

Figure 4:
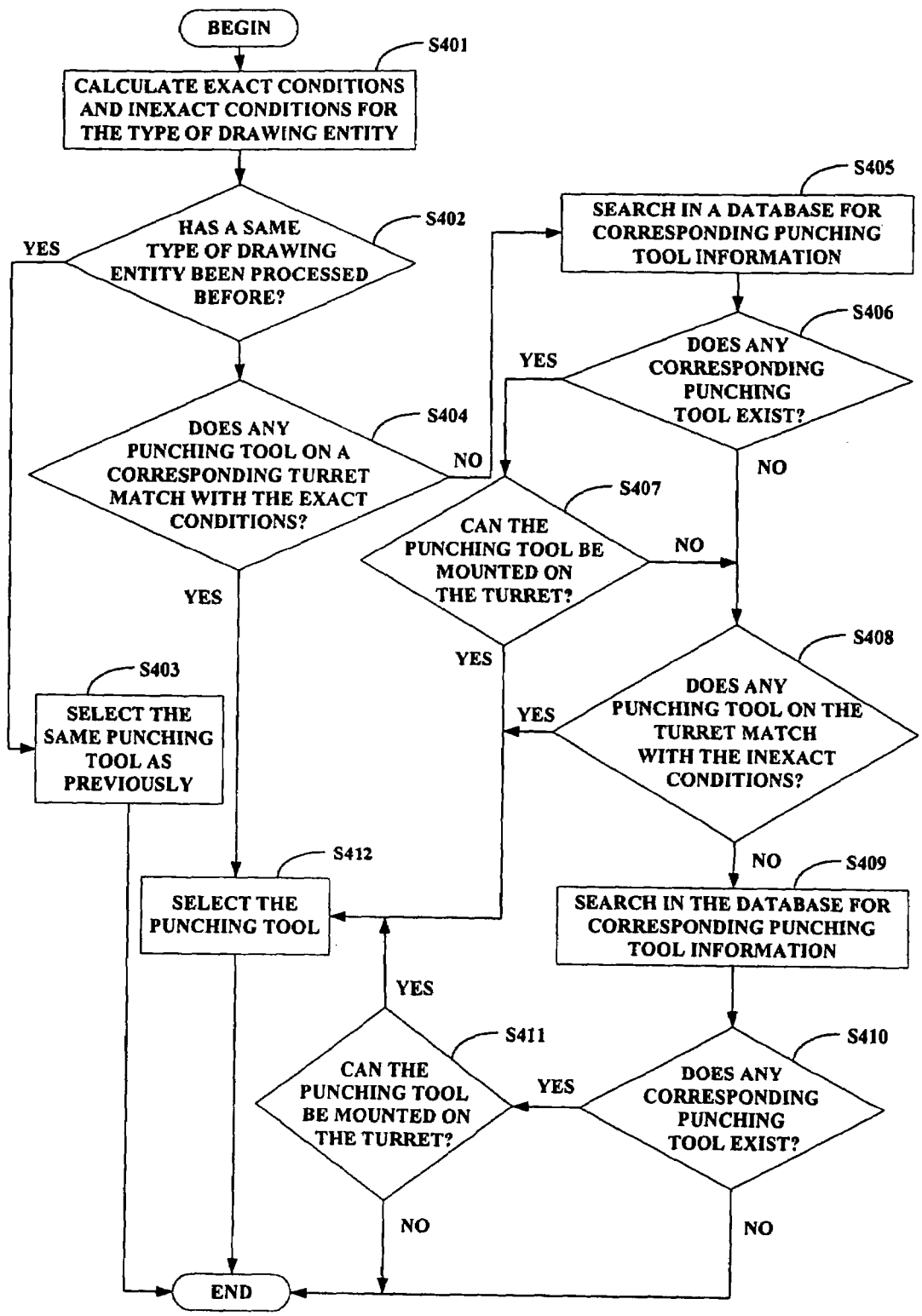
FIG. 4 is a flowchart of a preferred method for implementing one of steps of FIG. 3, namely selecting a punching tool for each type of drawing entity.

FIG. 4 is a flowchart of a preferred method for implementing step S302 of FIG. 3, namely selecting a punching tool for each type of drawing entity according to sizes and a shape of the type of drawing entity and according to materials of the workpieces and machining allowances set by users. In step S401, the condition maintaining sub-module 310 calculates exact conditions and inexact conditions for each type of drawing entity of the workpieces. In step S402, the matching sub-module 320 determines whether the same type of drawing entity has been processed before. If the same type of drawing entity has been processed before, in step S403, the matching sub-module 320 selects the punching tool which was previously used to machine the same type of drawing entity, whereupon the procedure is ended. If the same type of drawing entity has not been processed before, in step S404, the matching sub-module 320 determines whether any punching tool on a corresponding turret matches with the exact conditions of the type of drawing entity. If any punching tool on the turret matches with the exact conditions of the type of drawing entity, the procedure goes directly to step S412 described below. If no punching tool on the turret matches with the exact conditions of the type of drawing entity, in step S405, the searching sub-module 330 searches in the database 2 for corresponding punching tool information that matches with the exact conditions of the type of drawing entity. In step S406, the searching sub-module 330 determines whether any corresponding punching tool exists in the database 2 according to the searched punching tool information. If a corresponding punching tool exists in the database 2, in step S407, the matching sub-module 320 determines whether the punching tool can be mounted on the turret according to specifications of the punching tool, the type of the turret, and sizes of tool stations on the turret. If the punching tool can be mounted on the turret, the procedure goes directly to step S412 described below. If no punching tool matches with the exact conditions of the type of drawing entity, or the corresponding punching tool cannot be mounted on the turret, in step S408, the matching sub-module 320 determines whether any punching tool on the turret matches with the inexact conditions of the type of drawing entity. If any punching tool on the turret matches with the inexact conditions of the type of drawing entity, the procedure goes directly to step S412 described below. If no punching tool on the turret matches with the inexact conditions of the type of drawing entity, in step S409, the searching sub-module 330 searches in the database 2 for corresponding punching tool information that matches with the inexact conditions of the type of drawing entity. In step S410, the searching sub-module 330 determines whether any corresponding punching tool exists in the database 2 according to the searched punching tool information. If a corresponding punching tool exists in the database 2, in step S411, the matching sub-module 320 determines whether the punching tool can be mounted on the turret according to specifications of the punching tool, the type of the turret, and sizes of tool stations on the turret. If the punching tool can be mounted on the turret, the procedure goes directly to step S412 described below. If no punching tool matches with the inexact conditions of the type of drawing entity, or the corresponding punching tool cannot be mounted on the turret, the procedure is ended. In step S412, the matching sub-module 320 selects the punching tool, whereupon the procedure is ended.

Figure 5:
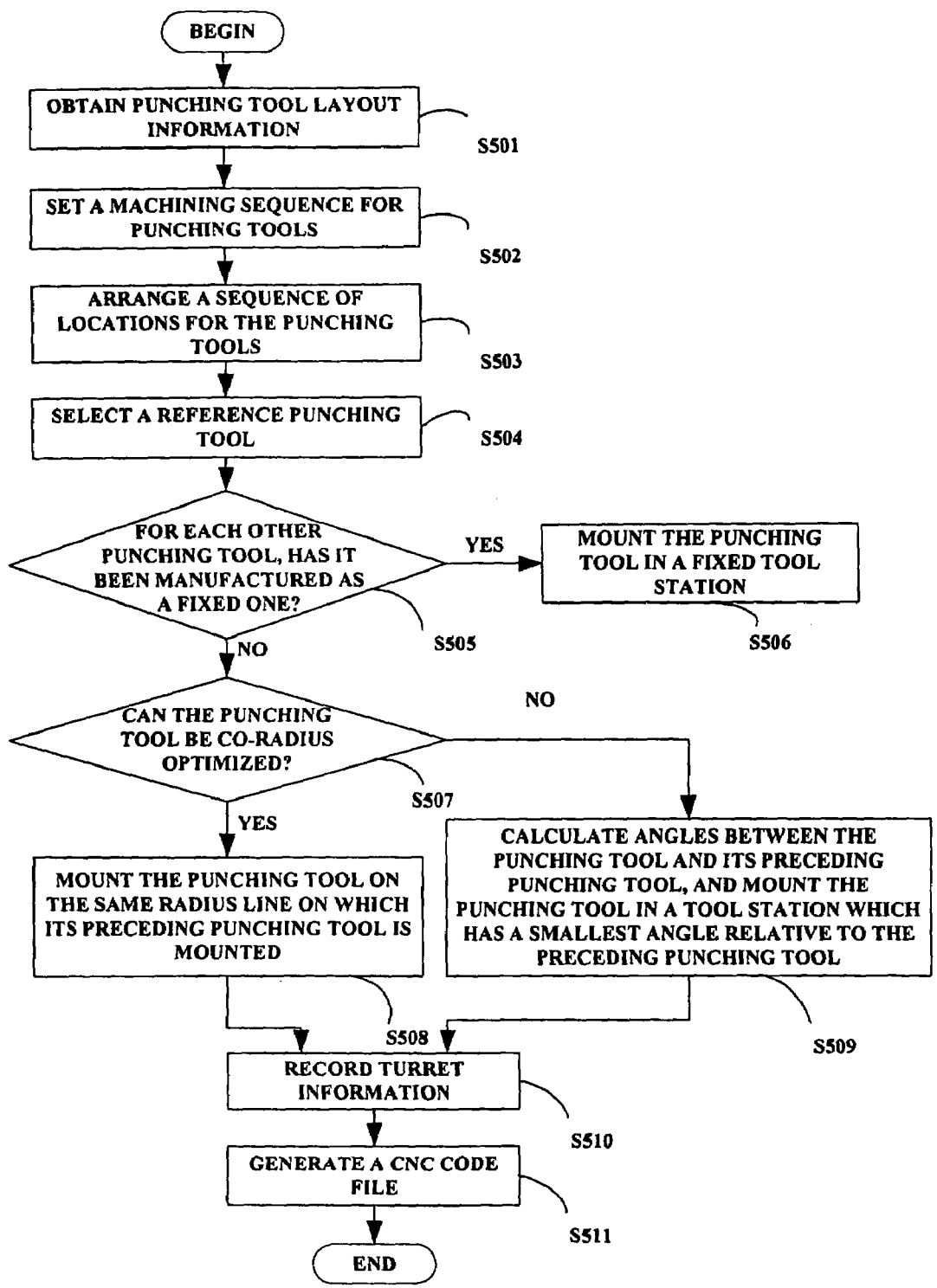
FIG. 5 is a flowchart of a preferred method for implementing two other steps of FIG. 3, namely optimizing a sequence of locations of punching tools on a turret, and generating a CNC code file.

FIG. 5 is a flowchart of a preferred method for implementing steps S304 and S305 of FIG. 3, namely optimizing the sequence of locations of punching tools on the turret, and generating a CNC code file according to the optimized turret information and the machining paths of punching tools on the turret. In step S501, the turret optimizing module 50 ("the module 50") obtains punching tool layout information from the database 2. In step S502, the module 50 sets a machining sequence for punching tools on a turret according to distributions of drawing entities of various types and according to materials of the workpieces. In step S503, the module 50 arranges a sequence of locations for the punching tools on the turret according to the set machining sequence. After arranging a sequence of locations for the punching tools on the turret, the module 50 then selects a corresponding tool station on the turret for each punching tool according to the sequence of locations of punching tools on the turret and according to the principle that the punching tools are changed in the shortest possible time (see S504~S509 described below). In step S504, the module 50 selects a reference punching tool and a tool station for the reference punching tool. In step S505, for each punching tool other than the reference punching tool, the module 50 determines whether the punching tool has been manufactured as a fixed one. If the punching tool has been manufactured as a fixed one, in step S506, the module 50 mounts the punching tool in a corresponding fixed tool station. If the punching tool has not been manufactured as a fixed one, in step S507, the module 50 determines whether the punching tool can be co-radius optimized. According to the preferred embodiment, co-radius optimizing a punching tool means mounting the punching tool on a same radius line of a turret on which its preceding punching tool is mounted according to the types and parameters of both said punching tools. If the punching tool can be co-radius optimized, in step S508, the module 50 mounts the punching tool on the same radius line which its preceding punching tool is mounted. If the punching tool cannot be co-radius optimized, in step S509, the module 50 calculates angles between the punching tool and its preceding punching tool, and mounts the punching tool in a tool station which has a smallest angle relative to the preceding punching tool. In step S510, the module 50 records the turret information. In step S511, the CNC code generating module 60 generates a CNC code file according to the turret information and the machining paths of the punching tools on the turret, and stores the CNC code file in the database 2.

Figure 6:
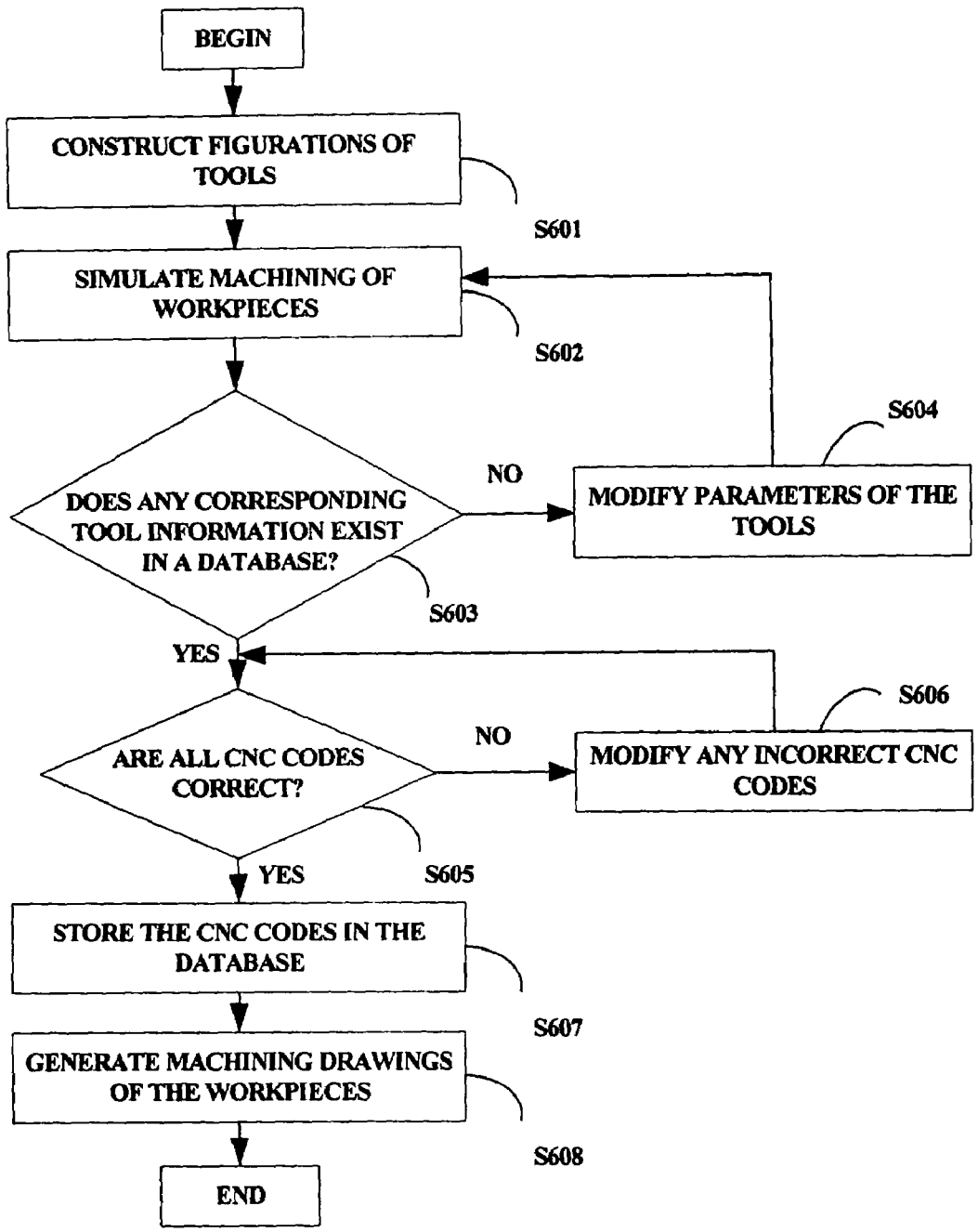
FIG. 6 is a flowchart of a preferred method for implementing still another step of FIG. 3, namely simulating machining of workpieces according to the generated CNC code file.

FIG. 6 is a flowchart of a preferred method for implementing step S306 of FIG. 3, namely simulating machining of the workpieces according to the generated CNC code file. In step S601, the CNC code simulating module 70 ("the module 70") constructs figurations of the punching tools according to the parameters of the punching tools recorded in the CNC code file. In step S602, the module 70 simulates machining of the workpieces according to the figurations, the machining paths and the machining sequence of the punching tools. In step S603, the module 70 searches in the database 2 for corresponding punching tool information according to the parameters of the punching tools recorded in the CNC code file, and determines whether any corresponding punching tool information exists in the database 2. If no corresponding punching tool information exists in the database 2, in step S604, the module 70 modifies the parameters of the punching tools recorded in the CNC code file, whereupon the procedure returns to step S602 described above. If any corresponding punching tool information exists in the database 2, in step S605, the module 70 determines whether all the CNC codes in the CNC code file are correct according to ISO (International Standards Organization) standards for the CNC codes. If any CNC codes are incorrect, in step S606, the module 70 modifies the incorrect CNC codes, whereupon the procedure returns to step S605 described above. If and when all the CNC codes are correct, in step S607, the module 70 stores the CNC code file in the database 2. In step S608, the module 70 generates machining drawings of the workpieces, and saves the machining drawings in the database 2.

Although the present invention has been specifically described on the basis of a preferred embodiment and preferred methods, the invention is not to be construed as being limited thereto. Various changes and modifications may be made to the embodiment and methods without departing from the scope and spirit of the invention.

What is claimed is:

1. A computer-aided manufacturing system for sheet-metal punching which can automatically select and lay out punching tools, optimize turrets, generate CNC code files and simulate machining of workpieces, comprising:
    a plurality of client computers for providing user interfaces enabling users to transmit client drawings and obtain machining drawings of the workpieces;
    a database for storing information including the client drawings, punching tool information, turret information, punching tool layout information, production management information, and machining drawings and statements, wherein turret information comprises types and a machining sequence of punching tools on each turret; and
    a server comprising:
        a punching tool selecting module for selecting an optimum punching tool for each type of drawing entity of the workpieces according to sizes and a shape of the type of drawing entity and machining allowances set by one or more users;
        a punching tool layout module for selecting a corresponding tool station on a turret for each selected punching tool according to a type of the turret and specifications of the selected punching tool, mounting the selected punching tool in the corresponding tool station, and selecting an optimum machining path for the selected punching tool;
        a turret optimizing module for setting a machining sequence for the selected punching tools, and optimizing a sequence of locations of the selected punching tools on each turret according to the machining sequence and the principle that punching tools are changed in the shortest possible time;
        a CNC (computer numerical control) code generating module for generating CNC code files according to the optimized turret information and the machining paths of the punching tools, and saving the CNC code files in the database; and
        a CNC code-simulating module for constructing figurations of the punching tools according to the CNC code files, simulating machining of the workpieces according to the turret information, the figurations and the machining paths of the punching tools, and generating machining drawings of the workpieces.

2. The computer-aided manufacturing system for sheet-metal punching according to claim 1, wherein the system is adapted to be connected to a production management system that calculates usage rates of the materials and machining times for the workpieces and generates statements for controlling of machining processes via a network.

3. The computer-aided manufacturing system for sheet-metal punching according to claim 1, wherein the server further comprises a client drawing processing module for receiving client drawings, obtaining information on the workpieces from the client drawings, and storing the client drawings in the database.

4. The computer-aided manufacturing system for sheet-metal punching according to claim 1, wherein the server further comprises a punching tool maintaining module for modifying parameters of the punching tools, and deleting and replacing the punching tools.

5. The computer-aided manufacturing system for sheet-metal punching according to claim 2, wherein the server further comprises a production management module for exporting relevant production management information to the production management system to enable the calculation of usage rates of raw materials and the machining times for the workpieces and enable the generation of statements for controlling of machining processes via a network.

6. The computer-aided manufacturing system for sheet-metal punching according to claim 1, wherein the punching tool selecting module further comprises a condition maintaining sub-module for calculating exact conditions and inexact conditions for each type of drawing entity.

7. The computer-aided manufacturing system for sheet-metal punching according to claim 6, wherein the punching tool selecting module further comprises a matching sub-module for determining whether any punching tool on a turret matches at least one type of drawing entity according to the calculated exact conditions or inexact conditions of the type of drawing entity, and selecting the punching tool if it matches the exact conditions or inexact conditions of at least one type of drawing entity.

8. The computer-aided manufacturing system for sheet-metal punching according to claim 7, wherein the punching tool selecting module further comprises a searching sub-module for searching in the database for corresponding punching tool information if no punching tool on the turret matches any one type of drawing entity.

9. The computer-aided manufacturing system for sheet-metal punching according to claim 1, wherein the CNC code-simulating module is also for modifying parameters of the punching tools recorded in the CNC code file when no corresponding punching tool information exists in the database, and modifying any incorrect CNC codes in the CNC code files according to ISO (International Standards Organization) standards for CNC codes.

10. A computer-aided manufacturing method for sheet-metal punching, the method comprising the steps of:
    receiving a client drawing from a client computer and obtaining information on workpieces;
    selecting a punching tool for each type of drawing entity of the workpieces according to sizes and a shape of the type of drawing entity and according to machining allowances set by one or more users;
    mounting the selected punching tools and selecting an optimum machining path for each selected punching tool;
    setting a machining sequence for the selected punching tools on a turret according to distributions of drawing entities of various types and according to materials of the workpieces;
    optimizing a sequence of locations of the selected punching tools on the turret according to the machining sequence and the principle that punching tools are changed in the shortest possible time;

generating a CNC code file according to the turret information and the machining paths of punching tools;

constructing figurations of the punching tools according to the CNC code file, simulating machining of the workpieces according to the turret information, the figurations and the machining paths of punching tools, and generating machining drawings; and exporting relevant production management data to a production management system for calculation of machining times and usage rates of materials and for generation of statements for control of one or more relevant machining processes.

11. The method according to claim 10, wherein selecting a punching tool for each type of drawing entity further comprises calculating exact conditions for the type of drawing entity according to sizes and a shape of the type of drawing entity and calculating inexact conditions for the type of drawing entity according to materials of the workpieces and machining allowances set by one or more users.

12. The method according to claim 11, wherein selecting a punching tool for each type of drawing entity further comprises determining whether the type of drawing entity has been processed before, and selecting the punching tool which was previously used to machine the type of drawing entity if the type of drawing entity has been processed before.

13. The method according to claim 11, wherein selecting a punching tool for each type of drawing entity further comprises determining whether any punching tool on the turret matches the exact conditions of the drawing entity if the type of drawing entity has not been processed before, and selecting the punching tool if it matches the exact conditions.

14. The method according to claim 13, wherein selecting a punching tool for each type of drawing entity further comprises determining whether any punching tool information in a database matches the exact conditions of the type of drawing entity, if no punching tool on the turret matches the exact conditions of the type of drawing entity.

15. The method according to claim 14, wherein selecting a punching tool for each type of drawing entity further comprises determining whether any punching tool exists that matches the exact conditions according to the searched punching tool information in the database.

16. The method according to claim 15, wherein selecting a punching tool for each type of drawing entity further comprises determining whether the punching tool can be mounted on the turret if such punching tool exists that matches the exact conditions, and selecting the punching tool if it can be mounted on the turret.

17. The method according to claim 16, wherein selecting a punching tool for each type of drawing entity further comprises determining whether any punching tool on the turret matches the inexact conditions of the type of drawing entity, if no corresponding punching tool in the database matches the exact conditions or if the punching tool cannot be mounted on the turret, and selecting the punching tool if it matches the inexact conditions.

18. The method according to claim 17, wherein selecting a punching tool for each type of drawing entity further comprises searching the database for corresponding punching tool information that matches the inexact conditions if no punching tool on the turret matches the inexact conditions.

19. The method according to claim 18, wherein selecting a punching tool for each type of drawing entity further comprises determining whether any corresponding punching tool exists that matches the inexact conditions according to the searched punching tool information.

20. The method according to claim 19, wherein selecting a punching tool for each type of drawing entity further comprises determining whether the punching tool can be mounted on the turret if such punching tool exists that matches the inexact conditions, and selecting the punching tool if it can be mounted on the turret.

21. The method according to claim 10, wherein optimizing a sequence of locations of the selected punching tools on a turret further comprises selecting a reference punching tool, and selecting a corresponding fixed tool station for the reference punching tool.

22. The method according to claim 21, wherein optimizing a sequence of locations of the selected punching tools on a turret further comprises determining whether each punching tool other than the reference punching tool has been manufactured as a fixed one, and mounting the punching tool in a corresponding fixed tool station if it has been manufactured as a fixed one.

23. The method according to claim 22, wherein optimizing a sequence of locations of the selected punching tools on a turret further comprises determining whether the punching tool can be co-radius optimized if it has not been manufactured as a fixed one, and mounting the punching tool on the same radius line on which its preceding punching tool is mounted if it can be co-radius optimized.

24. The method according to claim 23, wherein optimizing a sequence of locations of the selected punching tools on a turret further comprises calculating angles between the punching tool and its preceding punching tool if it cannot be co-radius optimized, and mounting the punching tool in a tool station which has a smallest angle relative to the preceding punching tool.

25. The method according to claim 24, wherein optimizing a sequence of the selected punching tools on a turret further comprises recording the turret information, generating a CNC code file, and storing the CNC code file in a database.

26. The method according to claim 10, wherein simulating machining of the workpieces further comprises modifying any incorrect CNC codes in the CNC code file, and modifying parameters of the punching tools if no corresponding punching tool information exists in a database.

27. A computer-aided manufacturing method for sheet-metal punching, the method comprising the steps of:

obtaining information on workpieces;

a computer selecting punching tools;

a computer mounting the selected punching tools and selecting an optimum machining path for each selected punching tool;

a computer setting a machining sequence for the selected punching tools;

a computer optimizing a sequence of locations of the selected punching tools according to the machining sequence and the principle that punching tools are changed in the shortest possible time;

generating a computer numerical control (CNC) code file;

simulating machining of the workpieces; and exporting relevant production management data to a production management system.

* * * * *